United States Patent [19]

Aldcroft et al.

[11] Patent Number: 5,232,724
[45] Date of Patent: * Aug. 3, 1993

[54] METHOD FOR STABILIZING ALCOHOLIC BEVERAGES USING AN AQUEOUS SUSPENSION CONTAINING AMORPHOUS SILICA

[75] Inventors: Derek Aldcroft, South Wirral; John R. Newton, Altrincham, both of England

[73] Assignee: Unilever Patent Holdings B.V., Rotterdam, Netherlands

[ * ] Notice: The portion of the term of this patent subsequent to Apr. 7, 2009 has been disclaimed.

[21] Appl. No.: 613,063

[22] Filed: Nov. 15, 1990

Related U.S. Application Data

[62] Division of Ser. No. 453,320, Dec. 22, 1989, Pat. No. 5,102,676.

[30] Foreign Application Priority Data

Dec. 22, 1988 [GB] United Kingdom ................. 8830024

[51] Int. Cl.$^5$ .............................................. C12H 1/04
[52] U.S. Cl. ................................... 426/330.4; 426/423
[58] Field of Search ................... 426/423, 330.3, 573, 426/577, 330.4, 532

[56] References Cited

U.S. PATENT DOCUMENTS

| | | | |
|---|---|---|---|
| 4,64,530 | 8/1987 | Welsh | 426/423 |
| 3,958,023 | 5/1976 | Butterworth | 426/423 |
| 4,508,742 | 4/1985 | McLaughlin | 426/423 |
| 4,636,394 | 1/1987 | Hsu | 426/423 |
| 4,753,791 | 6/1988 | Muller | 424/52 |
| 4,797,294 | 1/1989 | Berg | 426/423 |
| 4,828,833 | 5/1989 | Cordon | 424/58 |
| 4,880,650 | 11/1989 | Okamura | 426/423 |
| 5,102,676 | 4/1992 | Aldcroft | 426/423 |

FOREIGN PATENT DOCUMENTS 0183139 6/1986 European Pat. Off. ............ 426/423
2721053 11/1978 Fed. Rep. of Germany .

*Primary Examiner*—Carolyn Paden
*Attorney, Agent, or Firm*—Cushman, Darby & Cushman

[57] ABSTRACT

Amorphous silica can be prepared in a stable and pumpable suspension, suitable for use in alcoholic beverage stabilisation, by adding a polysaccharide or inorganic gelling agent. Examples of polysaccharides are carboxy methyl celluloses, guar gum and Xanthan gum. Preferably the suspension contains sorbic acid, benzoic acid or a benzoate to give synergistic action with the polysaccharide.

10 Claims, No Drawings

METHOD FOR STABILIZING ALCOHOLIC BEVERAGES USING AN AQUEOUS SUSPENSION CONTAINING AMORPHOUS SILICA

This is a division of application Ser. No. 07/453,320, filed Dc. 22, 1989, now U.S. Pat. No. 5,102,676.

FIELD OF THE INVENTION

The invention relates to commercially sterile pumpable aqueous suspensions of fine particle sized amorphous silicas and their use in the treatment of beers and other alcoholic fermented beverages to stabilise the beverage properties during storage.

BACKGROUND TO THE INVENTION

Alcoholic fermented beverages, for example beers, have a tendency to produce haze during storage and a number of products and processes are known for the removal of haze, and haze forming constituents. Filtration can remove the initial haze or turbidity from the beer, but in certain cases a further haze can develop on storage, particularly if the beer is stored at temperatures near 0° C. This so-called chill-haze would only be noticeable at the point of consumption and consequently could not be removed.

It is therefore desirable to remove during production of the alcoholic beverage both the haze developed during the fermentation processes or on standing prior to final processing together with the haze precursors which may develop haze during storage.

The materials used for treating the beverage must not remove the components which are essential to the character, i.e. body and flavour, of the beer or the head forming components and colouring.

Various materials such as bentonites, active carbon, polyvinylpyrollidone and silicas have been previously proposed for this purpose and are used commercially, but silicas are preferred because they are selective in removing the protein species responsible for haze formation without impairing the desired properties of the beverage.

Prior literature shows that silicas either in the form of xerogels, hydrogels and precipitated silicas with surface areas ranging from 200 to $1000 m^2 g^{-1}$, pore volumes 0.35 to 2.5 $ccg^{-1}$ and particle sizes in the range 3 to 30 $\mu$ can be used to remove protein from beer. More specifically the use of silica hydrogels with surface areas greater than 700 $m^2 g^{-1}$ are disclosed in GB 1,215,928 for the treatment of beer, and reference is also made that the hydrogel can be used as a slurry although the powder form is preferred. The specification contains no information on the preparation of a slurry.

Fine particle sized xerogels and precipitated silicas have one pronounced disadvantage and that is their excessive dusting when introduced into the dosing equipment normally employed in the brewery. Silica hydrogels containing 30% to 60% by weight of $SiO_2$ are practically non-dusting, but these materials are extremely cohesive and as a consequence they require specially designed equipment for them to be successfully handled in bulk.

In the brewing process, filter room materials used to aid filtration and induce stabilisation are dosed to the beer either in aqueous suspension or dispersed in beer. It would be desirable, therefore, to provide a stable pumpable suspension of fine particle sized synthetic silica for use in the brewing, eliminating the need for secondary processing, with it associated problems. A stable pumpable suspension of fine particle sized silica hydrogel is preferred in view of its improved filtration performance over finely ground xerogels and precipitated silicas. The suspension of fine particle size amorphous silicas would need to remain pumpable on storage and be free of micro-organisms, such as yeasts and moulds, at the point of use.

Although the present invention is directed to the treatment of beers, which term includes ales, lagers and stouts, it is applicable to other fermented liquids eg. wines, which are liable to generate haze on storage.

GENERAL DESCRIPTION OF THE INVENTION

The invention proposes the use of an effective stabilising system comprising a polysaccharide and, preferably, an effective biocidal amount of sorbic acid benzoic acid, benzoate or mixtures thereof, for maintaining an aqueous suspension of fine particle size amorphous silica as a stable pumpable slurry. Synergism has been found between the sodium carboxymethylcellulose described in the Examples and the sorbic acid benzoic acid or benzoate in effecting improved redispersion characteristics, after storage, to the aqueous suspension of fine particle size amorphous silica.

Accordingly, the invention provides a pumpable stable aqueous suspension of amorphous silica characterised in that the amorphous silica has a weight mean particle size in the range from about 5 $\mu m$ to about 20 $\mu m$, the silica content of the suspension is from about 5% to about 15% and containing an effective amount of a polysaccharide, preferably from about 0.15% to about 0.75% by weight, and sorbic acid benzoic acid or benzoate as a preferred component in an amount of from about o.2 to about 0.5% by weight to give the desired stabilisation and redispersion characteristics. An essential feature of the invention is that the gelling agent is an organic gelling agent, preferably a polysaccharide, is capable of increasing the viscosity of the aqueous suspension. The polysaccharide may be selected from sodium carboxymethylcellulose, guar gum, alginate, xanthan, pectin, carrageenans, tamarind and mixtures thereof. The amorphous silica is preferably silica hydrogel, silica and mixtures thereof. When the amorphous silica is xerogel, precipitated silica or mixture thereof, it will usually be present in an amount from about 8% preferably from about 10%, to about 15% by weight (dry).

Equally an inorganic gelling agent would have a similar effect and the suitable materials may be selected from Laponite (R), montmorillinite and kaolin clays, gel or substrate aluminas e.g. pseuoboehmites, gelling crystalline aluminas e.g. gamma aluminas and bayerite, and gelling amorphous aluminas, or mixtures thereof.

The amorphous silica has a surface area S(B.E.T.) to nitrogen of from about 200 to about 1100 $m^2 g^{-1}$. Where the amorphous silica is either a silica xerogel or a precipitated silica the preferred pore volume is from about 0.8 to about 2.5 $ccg^1$. Where the amorphous silica is a silica hydrogel the preferred $SiO_2$ content is from about 25 to about 55% by weight.

Preferably the gelling agent for a silica hydrogel is a polysaccharide and the optimum effect is obtained when the polysaccharide is added before milling, but the biocidal agent can be added at any stage.

The fine particle size amorphous silica suspension will be used to induce the necessary storage life into beers, lagers etc. by treating the beverage with not more than about 1 g of silica (dry weight) per liter. The suspended silica particles in the beer can then be separated by filtration.

The polysaccharides will be of food standard compatibility to allow the amorphous silica suspensions to be used in the treatment of alcoholic beverages. The biocidal agent component, when present, provides a commercially sterile suspension because of its microbiological effect. Other sterilising agents eg. sulphites are usable with the polysaccharide.

TEST PROCEDURES i) Microbiological Purity

The microbiological purity of the slurry is measured using "Easicult combi" culture sticks, manufactured by Orion Diagnostica, Espoo Finland.

The pre-prepared Agar slide is dipped into the slurry and allowed to drain. The slide is then placed in a sterile tube and the incubation period commences. Following incubation (time is dependent on temperature) the number of bacteria are read against the colour chart supplied. Following further incubation yeasts and fungi may also be estimated.

ii) Settlement and Redispersibility

Prepared slurries are stored at room temperature in stoppered 100 ml measuring cylinders. At the end of the storage period, the volume of slurry below the supernatant liquor is measured, the larger the volume the better the stability which has been achieved. The redispersibility is measured by the number of inversions of the cylinder to achieve total redispersion of the slurry.

iii) Accelerated ageing test

This test is designed to give an indication of the stability of bottled beer and samples are subjected to an alternating cooling and heating cycle. Filtered, treated beer is bottled in standard 275 ml bottles.

The temperature of the heating bath is 40° C. and the cooling bath is at 0° C.

Samples are placed in the heating bath for 24 hours and then cooling bath for 24 hours. The haze is then read on an EBC hazemeter Type UKMle (obtainable from Ratiometer company of Copenhagen) and the cycling continued until the haze reading exceeds 12. A control sample of untreated beer is cycled at the same time to give a measure of the improvement in stability achieved by treating with silica.

iv) Saturated ammonium sulphate precipitation limit

The proteins in beer which precipitate in the presence of ammonium sulphate are considered to be the most important precursors in the development of nitrogenous haze.

Degassed beer (10 ml) is pipetted into a nephelometer tube and the latter placed in an instrument (a Unigalvo 200 obtained from Baird and Tatlock of England) and set to zero scale reading. The sample tube is then replaced with the standard cloud tube and a scale reading of 100 obtained using the sensitivity control. 0.4 ml aliquots of saturated ammonium sulphate are then added to the beer sample and the nephelometer reading taken. The volume of solution required to give a reading of 3 is noted; this is quoted as the SASPL value (mls) for the sample.

The absorption ability of silicas and other clarifying agents can be quantified by this method because a silica treated beer will give a higher SASPL value than the control beer sample. Silica (1 g) is contacted with the test beer (1 liter) at 0° C. for 5 minutes; the beer is filtered before testing. The absorption ability can thus be quoted as D SASPL (mls), which is the difference between the two values.

v) Weight mean particle size

The weight mean particle size of the silicas was determined with the aid of a Malvern Particlesizer, Model 3600 E. This instrument, made by Malvern Instruments, Malvern, Worcestershire uses the principle of Fraunhöffer diffraction utilising a low power He/Ne laser. Before measurement the sample was dispersed ultrasonically in water for a period of 7 minutes to form an aqueous suspension.

vi) Viscosity Determination

Aliquots of the prepared slurries were transferred to the cup of a Haake viscometer (Rotovisco RV12) and measurements were determined under the following conditions. The viscometer was coupled with a Haake PG 142 programmer and a x-y-t plotter.

| Measuring head | M500 |
|---|---|
| Sensor system | MV1 |
| Speed rate | 0–128 rpm |
| Program | 1 minute at rest 3 minute ramp |
| Temperature | 25° C. |

Readings were taken at predetermined speeds and the viscosity calculated.

SPECIFIC DESCRIPTION OF THE INVENTION

The invention is further illustrated but not limited by the following examples in which parts and percentages are by weight, unless indicated otherwise.

In the examples where the amorphous silica was a hydrogel the latter was prepared by mixing 40% W/W sulphuric acid with sodium silicate solution (mol ratio 3.3:1; $SiO_2$:$Na_2O$) containing 25% W/W $SiO_2$ in a reactant ratio corresponding to an excess of acid (0.25 Normal) and an $SiO_2$ concentration of 18.5% W/W. The silica hydrogel is allowed to set to a hydrogel then broken down into manageable lumps and washed with water at 60° C. until the effluent pH is 3.0. On drying the hydrogel the derived silica xerogel has a surface area (BET) of 820 $m^2g^{-1}$ and a pore volume to nitrogen of 0.38 $cm^3g^{-1}$. Silica hydrogels with lower surface areas can be derived from this base feedstock by washing to higher pH, for example at pH 6.3 a hydrogel is obtained, which on drying, gives a xerogel with a surface area (BET) of 550 $m^2g^{-1}$ and a pore volume of 0.75 $cm\eta g^{-1}$.

In example VIII where the amorphous silica is either a precipitated silica or a silica xerogel, a precipitated silica prepared according to the teaching of EP 0287232 and a fine particle size xerogel product Gasil (R) EBN obtainable from Crosfield Chemicals of Warrington, England have been used to demonstrate the invention. The precipitated silica had a surface area S(B.E.T.) of 700 $m^2g^{-1}$ pore volume to mercury of 1.8 $ccg^{-1}$ and a weight mean particle size of 15 μm whereas the silica xerogel had a surface area S(B.E.T.) of 330 $m^2g^{-1}$, a nitrogen pore volume of 1.2 $ccg^{-1}$ and a particle size of 10 μm.

EXAMPLE I

A number of potential stabilising agents suitable for use in beverages were screened for their ability to maintain the fine particle sized silica hydrogel in suspension, they included
(i) Cetyl trimethyl ammonium chloride (CTAC)
(ii) Wyoming Bentonite
(iii) Bentone L.T. TM
(iv) Pseudoboehmite
(v) Sodium Lauryl Sarcosinate (Sarkosyl 0*)
(vi) Sodium carboxymethylcellulose (SCMC)
(vii) Sodium carrageenate In order to screen the candidate materials a suspension of fine particle sized silica hydrogel was made in the following manner. Measured aliquots of the lump silica hydrogel and water corresponding to a total mass of 3.5 Kg (8% $SiO_2$) were sheared with a Silverson mixer (type L2R) in a 5 liter stainless beaker for 15 minutes. The resultant slurry was then passed through an Eiger mill (ABM-L75V) using a feedrate commensurate with obtaining a product with a weight mean particle size of about 10 $\mu$m.

The fine particle sized silica hydrogel slurry was divided into 150 cm³ aliquots and a preselected amount of each stabilising agent was dispersed using a 25.4 mm castellated stirrer at 1000 rpm for 5 minutes in a 250 cm$\eta$ beaker. The modified suspensions of fine particle sized silica hydrogels were then transferred to 100 cm$\eta$ stoppered measuring cylinders where they were allowed to stand for 1o days, noting level of settlement and the ease of redispersion.

The result shown in Table 1 demonstrate that only sodium carboxymethyl cellulose when added at concentration of 2% W/W to the milled silica hydrogel suspension gives some degree of stabilisation, as reflected by the sedimentation volume with adequate redispersion characteristics.

EXAMPLE II

Following the procedure in Example I a further series of stabilisation tests were carried out. Different grades, one "medium viscosity" and one "high viscosity", of sodium carboxymethyl cellulose were used in addition to other potential stabilising agents.

The results are shown in Table II. These show that other polysaccharides such as Xanthan gum may be utilised.

EXAMPLE III

Following the procedure for the preparation of the fine particle size silica hydrogel in Example I a further series of stabilisation tests was carried out, where differing levels of sodium carboxymethylcellulose (2% to 6% w/w based on silica) were introduced to the silica hydrogel suspension before and after the final milling stage through the Eiger mill.

Each sample of hydrogel suspension was allowed to 15 stand for 27 days after which time the sedimentation volume and ease of redispersion of the sediments was assessed, together with the level of microbial activity present.

The results shown in Table III illustrate the good stabilising effect of sodium carboxymethylcellulose, and also that the additive has no microcidal effect as shown by the level of microbiological contamination.

EXAMPLE IV

In the examples given above it has been demonstrated that stabilised fine particle sized silica hydrogel suspensions can be prepared by introducing sodium carboxylmethylcellulose either before or after the final milling stage. For commercial benefit, these desirable features need to be accompanied with some degree of microbial purity on storage.

A series of fine particle size silica hydrogel slurries was prepared according to the method described in Example I, but in this instance different levels of sorbic acid (0.2%-0.4% w/w) were added, together with the perceived range of concentrations for sodium carboxymethycellulose (2% to 6% w/w based on $SiO_2$). The additives were dosed at the predetermined levels into the hydrogel slurries before, and after the final milling stage.

Samples of the milled hydrogel slurry containing the additives were allowed to stand for 27 days, noting the final sedimentation volume and the ease of redispersion.

The results are summarised in Tables IV and V and they show synergism between the additives, and the 15 subsequent effect on the ease of redispersion. The data also shows that incorporating sorbic acid into the fine particle sized silica hydrogel slurry results in a stabilised product having the desirable level of microbial purity for use as additive in beverages.

EXAMPLE V

In the examples given above it has been demonstrated that a combination of sodium carboxymethyl cellulose (4% w/w) and sorbic acid (0.2-0.4% w/w) added to the fine particle size silica hydrogel slurry results in a product (8% $SiO_2$) with the desirable features of remaining pumpable and free of microbial contamination after 27 days storage. It is necessary to specify both the particle size range and solids content of the fine particle size silica hydrogel for which these desirable features are obtained.

Measured quantities of the washed lump hydrogel commensurate with obtaining the predetermined solids content were dispersed in the required amount of water using a Silverson mixer. After shearing for 20 mins, sodium carboxymethylcellulose and sorbic acid were added to the silica hydrogel slurry at the concentrations of 4% w/w (based on $SiO_2$) and 0.4% w/w, respectively.

The slurries containing the additives were then passed through a Laboratory Rotomill (Torrance), varying the energy input and throughput to obtain products with weight mean particle sizes in the range 5 to 18 $\mu$m.

Samples of the milled hydrogel slurries of varying solids content and weight mean particle size were allowed to stand for 15 days as 100 cm³ aliquots in stoppered measuring cylinders, after which the final sedimentation volume, ease of redispersion and microbiological purity was determined.

Table VI lists the results obtained and they clearly show both the range of solids content and weight mean particle size for which the stabilisation system is effective. The data also shows that the sorbic acid at the specified level protects the silica hydrogel slurries from microbial contamination.

EXAMPLE VI

It has been demonstrated in Example V that effective stabilised silica hydrogel dispersions result from co-milling in the lump hydrogel in the presence of the stated levels of sodium carboxymethylcellulose and sorbic acid. A desirable feature is for the stabilised dispersion of silica hydrogel to remain pumpable on storage. This property is related to the initial viscosity and shear thinning behaviour, which in turn is dependant upon particle size and concentration of silica hydrogel particles present in the dispersion.

Measured quantities of washed lump hydrogel to obtain the required final silica concentration were dispersed in the necessary amount of water. After shearing for 20 minutes soidum carboxymethylcellulose and sorbic acid were added to the silica hydrogel slurry at the concentrations of 4% w/w (based on $SiO_2$) and 0.4% w/w respectively.

The slurries containing the additives were then passed through a Laboratory Rotomill (Torrance) varying the throughput to obtain hydrogel dispersions with weight mean particle sizes in the range 6 to 10 μm.

Samples of the milled hydrogel slurries of varying solids content and particle size were allowed to stand in sealed jars for 14 days. No settlement was observed and aliquots were removed for viscosity determination.

Table VII lists the viscosity measurements obtained on each slurry at varying shear rates (9 to 300 $sec^{-1}$). The data shows the slurries have acceptable viscosities at low shear rates (below 50 $sec^{-1}$), and that their viscosities reduce markedly, as the shear rate increases. Based on these results the hydrogel slurries would be considered to be pumpable.

EXAMPLE VII

To investigate the effect that lowering the surface area has upon the proposed stabilisation system, a series of hydrogels was prepared from the base hydrogel used in example 1 by washing to a higher effluent pH value.

Measured quantities of the lump hydrogel washing to varying pH values in the range 3.0 to 7.0 to obtain a solids content in the region of 10% w/w were dispersed in the required amount of water using a Silverson mixer. After shearing for 20 minutes the pH was adjusted to 3.0, and sodium carboxymethylcellulose and sorbic acid added to each silica hydrogel slurry at concentrations of 4% (based on $SiO_2$) and 0.4% by weight, respectively.

The slurries containing the additives were then passed through a laboratory Eiger mill using the required energy input to obtain a particle size in the region of 10 μm.

Samples of the milled hydrogel slurries, made from hydrogel feedstocks of varying surface area were allowed to stand for 15 days in 100 $cm^3$ aliquots in stoppered measuring cylinders, after which the final sedimentation volume, ease of redispersion and microbiological purity were determined.

The results obtained are summarised in Table VIII and they clearly show that the stabilisation system is effective for silica hydrogels with surface areas as low as 400 $m^2g^{-1}$. The level of sorbic acid employed protects the aqueous suspensions of silica hydrogels from microbial contamination.

EXAMPLE VIII

In the examples given above it has been demonstrated that a combination of sodium carboxymethylcellulose (3 to 5% w/w based on $SiO_2$) and sorbic acid (0.2 to 0.4%) is effective in stabilising slurries of silica hydrogel which remain pumpable and free of microbial contamination after 27 days storage.

The invention is satisfactory with other forms of amorphous silica such as precipitated silica and silica xerogels.

Measured quantities of Gasil (R) EBN and a precipitated silica as described in EP 0287232 to obtain a solids content in the range 8 to 15% were dispersed in the required amount of water using a Silverson mixer. After shearing for 5 minutes the pH was adjusted to 3.0 and the required amounts of sodium carboxymethylcellulose (3 to 5% w/w based on $SiO_2$) and sorbic acid (0.4% w/w) were added to each of the amorphous silica slurries. The slurries were then sheared for 5 to 10 minutes using the Silverson mixer to ensure complete dispersion of the additives.

Samples of the amorphous silica slurries were allowed to stand for 15 days in 100 $cm^3$ aliquots in stoppered measuring cylinders, after which the final sedimentation volume, ease of redispersion and microbiological purity were determined.

The results obtained are summarised in Table VIII and they demonstrate that the stabilisation system is effective for both precipitated silicas and silica xerogels provided the silica concentration range is 12 to 15% w/w.

EXAMPLE IX

In the examples give above, it has been demonstrated that commercially sterile, pumpable slurries of fine particle size silica hydrogels result from comilling the silica hydrogel slurry containing 4.0% (based on $SiO_2$) and 0.4% by weight sodium carboxymethylcellulose and sorbic acid, respectively.

Two hydrogel slurries, example V (Table VI) Hydrogel Slurry B and example VI (Table VIII) Hydrogel slurry B, were tested to determine their ability to stabilise beer. The hydrogel slurries had been allowed to stand for 28 days before testing. Two standard test procedures were employed:

saturated ammonium sulphate precipitation limit;
accelerated ageing tests.

The results obtained are summarised in Table X, and the data clearly shows the stable, pumpable hydrogel slurries obtained, even after storage, induce into the beer the level of stabilisation required to provide the desirable commercial benefit of longer shelf-life beer.

EXAMPLE X

In example IV above it was shown that the addition of sorbic acid to the system imparted the desired microbial purity to the stabilised milled hydrogel and also gave a synergistic effect on the ease of redispersion. There are, however, instances where the use of sorbic acid is not acceptable.

A series of fine particle size dispersions were prepared as in Example IV except that the $SiO_2$ content was 8, 11.5 or 15% by weight and the biocide added was sorbic acid, benzoic acid or sodium benzoate. All biocides were added at a level of 0.4% by weight. The SCMC was kept at a constant 3% based on weight of $SiO_2$. The additives were dosed after the final milling stage.

Samples of the milled hydrogel slurry containing the additives were allowed to stand for 35 days, after which the final sedimentation volume, ease of redispersion and level of microbiological purity were noted.

The results are shown in Table XI and they again show synergism between the additives with a positive effect on redispersion. All three systems produce the desired level of microbial purity for use as an additive in beverages.

EXAMPLE X

Examples VI and Table VII show that the stored slurries are considered to be pumpable. These slurries were prepared using SCMC and sorbic acid. Further trials have been carried out using different polysaccharides and biocides. The samples were prepared as in Example VI except that a) the polysaccharide/biocide combinations and levels were changed and b) viscosity tests were carried out almost immediately after preparation. All the work was carried out at 12.5% W/W $SiO_2$ loading, with biocide kept constant at 0.4%. SCMC level was 3% on $SiO_2$ content whereas Xanthan gum was added at 2% on $SiO_2$.

The results are shown in Table XII. The slurries containing sodium benzoate have viscosities which are too high for the slurry to be considered pumpable, although the products are good, stable suspensions (see above).

TABLE I

| Stabilisation Aid | % Addition (w/w)* | Settlement (cm³) | Redispersibility |
|---|---|---|---|
| Bentonite | 5.0 | 52.5 | fair |
| | 10.0 | 61.4 | fair |
| | 15.0 | 67.5 | fair |
| CTAC | 0.1 | 20.3 | Good |
| | 0.25 | 18.5 | Good |
| | 0.5 | 14.2 | Good |
| Bentone LT | 0.25 | 37.9 | Fair |
| | 0.625 | 26.9 | Fair |
| | 1.25 | 55 | Good |
| | 2.5 | 44.4 | Good |
| | 3.75 | 44 | Good |
| Pseudoboehmite | 5 | 11.3 | Poor |
| | 1 | 11.2 | Poor |
| | 1.5 | 11.2 | Poor |
| Sarkosyl 0 | 0.5 | 9.0 | Poor |
| | 1.0 | 9.0 | Poor |
| | 1.5 | 9.0 | Poor |
| SCMC | 0.5 | 39.5 | Good |
| | 1.0 | 43.9 | Good |
| | 1.5 | 51.7 | Good |
| | 2.0 | 73.6 | Good |
| Na Carrageenate | 1.0 | 19.7 | Good |
| | 2.0 | 36.6 | Good |
| | 3.0 | 36.3 | Good |
| Control | | 15.0 | Poor |

Average particle size of the silica hydrogel was 10.0 μm (Malvern).
*Percentage based on a dry silica basis.

TABLE II

| SUSPENSION AID | W/W (SiO₂) | SETTLEMENT (%) | TURNS TO REDISPERSE |
|---|---|---|---|
| SCMC (MED VISC) | 2 | 45 | 4 |
| | 4 | 48 | 2 |
| | 6 | 55 | 2 |
| SCMC (HIGH VISC) | 1 | 46 | 2 |
| | 2 | 53 | 1 |
| | 3 | 69 | 1 |
| GUAR GUM | 1 | 23 | 50+ |
| | 2 | 37 | 30 |
| | 3 | 42 | 12 |
| XANTHAN GUM | 1 | 43 | 2 |
| | 2 | 90 | 1 |
| | 3 | 95 | 1 |

The average particle size of the silica was 11.5μ (malvern).

TABLE III

| SCMC % w/w* | Addition re milling | Settlement (%) | Redispersibility | No of Colonies |
|---|---|---|---|---|
| 2% | Before | 80 | 50+ | TNTC |
| | After | 91 | 50+ | TNTC |
| 4% | Before | 88 | 12 | TNTC |
| | After | 93 | 15 | TNTC |
| 6% | Before | 98 | 8 | TNTC |
| | After | 94 | 17 | TNTC |

TNTC = Too numerous to count.
Average particle size of silica hydrogel was 9.8 μm (Malvern).
*Percentage expressed on a dry silica basis.

TABLE IV

| SCMC % W/W* | SETTLEMENT (%) | REDISPERSIBILITY | MICROBIOLOGICAL PURITY: NO OF COLONIES |
|---|---|---|---|
| 0.2% W/W SORBIC ACID | | | |
| 0 | 59 | 50+ | none |
| 2 Before | 83 | 6 | none |
| After | 81 | 50+ | none |
| 4 Before | 90 | 4 | none |
| After | 95 | 4 | none |
| 6 Before | 90 | 3 | none |
| After | 95 | 8 | none |
| 0.4% W/W SORBIC ACID | | | |
| 0 | 62 | 50+ | none |
| 2 Before | 88 | 6 | none |
| After | 80 | 50+ | none |
| 4 Before | 92 | 4 | none |
| After | 95 | 9 | none |
| 6 Before | 92 | 6 | none |
| After | 96 | 7 | none |

Average particle size of hydrogel was 9.5 μm (Malvern)
*Percentage expressed on a dry silica basis.

TABLE V

| SCMC % W/W | SETTLEMENT (%) | REDISPERSIBILITY | MICROBIOLOGICAL PURITY: NO OF COLONIES |
|---|---|---|---|
| 0.2% W/W SORBIC ACID | | | |
| 0 | 561 | 50+ | none |
| 2 Before | 81 | 50+ | none |
| After | 95 | 10 | none |
| 4 Before | 90 | 3 | none |
| After | 96 | 7 | none |
| 6 Before | 99 | 8 | none |
| After | 100 | 10 | none |
| 0.4% W/W SORBIC ACID | | | |
| 0 | 57 | 50+ | none |
| 2 Before | 81 | 50+ | none |
| After | 95 | 11 | none |
| 4 Before | 90 | 4 | none |
| After | 97 | 7 | none |
| 6 Before | 99 | 7 | none |
| After | 98 | 12 | none |

Average particle size of hydrogel was 10.5 μm (Malvern).
*Percentage expressed on a dry silica basis.

TABLE VI

| HYDROGEL SLURRY | SiO2 CONCENTRATION % W/W | AVERAGE PARTICLE SIZE μM | SETTLEMENT cmη | REDISPERSIBILITY | MICROBIOLOGICAL PURITY NO OF COLONIES |
|---|---|---|---|---|---|
| A | 8 | 6.1 | 93 | 4 | none |
| B | 12 | 5.3 | 97 | 1 | none |
| C | 8 | 10.2 | 95 | 4 | none |
| D | 14 | 14.1 | 90 | 4 | none |
| E | 10 | 18.0 | 95 | 2 | none |
| F | 15 | 10.3 | 97 | 2 | none |

TABLE VII

| SiO2 CONC W/W | WEIGHT MEAN PARTICLE SIZE μm | VISCOSITY (mPa·a) AT SHEAR RATE | | | | | |
|---|---|---|---|---|---|---|---|
| | | $9\,s^{-1}$ | $19\,s^{-1}$ | $37\,s^{-1}$ | $75\,s^{-1}$ | $150\,s^{-1}$ | $300\,s^{-1}$ |
| 8 | 6.5 | 1717 | 1488 | 1130 | 530 | 225 | 97 |
| 8 | 8.6 | 1546 | 1403 | 1031 | 451 | 190 | 86 |
| 8 | 9.5 | 1431 | 1316 | 916 | 422 | 186 | 86 |
| 10 | 9.2 | 1431 | 1202 | 576 | 272 | 82 | 41 |
| 12.5 | 9.0 | 2290 | 1947 | 816 | 372 | 136 | 61 |

TABLE VIII

| HYDROGEL/ SLURRY | WASH pH | SURFACE AREA $m^2 g^{-1}$ | SiO2 CONCENTRATION % W/W | AVERAGE PARTICLE SIZE μm | SETTLEMENT cmη | REDISPERSIBILITY | MICROBIOLOGICAL PURITY: NO OF COLONIES |
|---|---|---|---|---|---|---|---|
| A | 3.0 | 790 | 10 | 10.8 | 96 | 6 | none |
| B | 6.2 | 550 | 9 | 9.7 | 95 | 4 | none |
| C | 7.2 | 420 | 9 | 9.0 | 95 | 4 | none |

TABLE IX

| SiO2 % w/w | SCMC % w/w* | SORBIC ACID % w/w | SETTLEMENT (%) | REDISPERSIBILITY | NO. OF COLONIES |
|---|---|---|---|---|---|
| PRECIPITATED SILICA TO EP 0287232 | | | | | |
| 8 | 0 | 0 | 33 | 50+ | TNTC |
| 8 | 4 | 0.4 | 36 | 35 | NIL |
| 12 | 4 | 0.4 | 76 | 2 | NIL |
| 15 | 3 | 0.4 | 86 | 2 | NIL |
| 15 | 4 | 0.4 | 93 | 2 | NIL |
| 15 | 5 | 0.4 | 96 | 2 | NIL |
| XEROGEL - GASIL EBN (R) | | | | | |
| 8 | 0 | 0 | 31 | 50+ | TNTC |
| 8 | 4 | 0.4 | 45 | 17 | NIL |
| 12 | 4 | 0.4 | 76 | 2 | NIL |
| 15 | 3 | 0.4 | 92 | 2 | NIL |
| 15 | 4 | 0.4 | 98 | 2 | NIL |
| 15 | 5 | 0.4 | 91 | 2 | NIL |

*Based on SiO2

TABLE X

| HYDROGEL SLURRY | SASPL VALUE | D SASPL | CYCLES TO FAILURE |
|---|---|---|---|
| Example V - Table VI Hydrogel slurry B | 2.33 | 1.55 | 9 |
| Example VI - Table VIII Hydrogel Slurry B | 2.05 | 1.27 | 10 |
| Control Beer | 0.78 | — | 2 |

Dosing level 28 g/hl as SiO2.

TABLE XI

| BIOCIDE | LEVEL OF SiO2 (W/W) | SETTLEMENT | REDISPERSIBILITY | NO OF COLONIES |
|---|---|---|---|---|
| NONE | 8 | 47 | 6 | TNTC |
| | 12.5 | 53 | 5 | TNTC |
| | 15 | 65 | 10 | TNTC |
| SORBIC ACID | 8 | 52 | 5 | NONE |
| | 12.5 | 65 | 5 | NONE |
| | 15 | 78 | 7 | NONE |
| BENZOIC ACID | 8 | 51 | 6 | NONE |
| | 12.5 | 64 | 6 | NONE |
| | 15 | 79 | 7 | NONE |
| SODIUM BENZOATE | 8 | 54 | 3 | NONE |
| | 12.5 | 63 | 2 | NONE |

TABLE XI-continued

| BIOCIDE | LEVEL OF SiO$_2$ (W/W) | SETTLEMENT | REDISPERS- IBILITY | NO OF COLONIES |
|---|---|---|---|---|
| | 15 | 78 | 5 | NONE |

Average particle size of hydrogen was 11.3μ (Malvern).
TNTC = Too numerous to count

TABLE XII

| SUSPEN- SION AID | BIOCIDE | VISCOSITY (mPa·s) AT SHEAR RATE | | | | | |
|---|---|---|---|---|---|---|---|
| | | 9 | 19 | 37 | 75 | 150 | 300 |
| SCMC | Na benzoate | 10018 | 5553 | 2590 | 1338 | 676 | 367 |
| SCMC | Benzoic acid | 344 | 257 | 243 | 214 | 168 | 112 |
| SCMC | Sorbic acid | 425 | 342 | 278 | 214 | 168 | 125 |
| Xanthan | Na benzoate | 5152 | 4952 | 2719 | 1145 | 519 | 254 |
| Xanthan | Benzoic acid | 400 | 315 | 214 | 143 | 97 | 59 |

We claim:

1. A method of stabilising alcoholic beverages which comprises adding to the beverage during production an effective amount of a stable pumpable aqueous suspension containing from about 5% to about 15% by weight of an amorphous silica having a weight mean particle size in the range from about 5 to about 20 micron stabilised by an effective amount of a polysaccharide or an inorganic gelling agent.

2. A method as claimed in claim 1 wherein the amorphous silica is selected from silica hydrogels, silica xerogels, precipitated silicas and mixtures thereof.

3. A method as claimed in claim 1 wherein the suspension contains a silica xerogel or precipitated silica or mixture thereof in an amount of from about 8%, preferably from about 10%, to about 15% by weight (dry).

4. A method as claimed in claim 1 wherein the suspension contains about 0.15% to about 0.75% (w/w) of stabilising polysaccharide.

5. A method as claimed in claim 1 wherein the suspension further contains an effective biocidal amount of sorbic acid, sodium benzoate or benzoic acid or mixtures thereof.

6. A method as claimed in claim 5 wherein the sorbic acid sodium benzoate or benzoic acid or mixture is present in an amount of from about 0.2% to about 0.5% w/w.

7. A method as claimed in claim 1 wherein the polysaccharide is selected form sodium carboxymethylcellulose, guar, alginate, xanthan, pectin, carrageenans, tamarind, a cellulose gum with a substitution of 0.7 to 1.2 and mixtures thereof.

8. A method as claimed in claim 1 wherein the amorphous silica has a surface area (BET) in the range from about 200 to about 12,100 m$^2$g$^{-1}$.

9. A method as claimed in claim 8 wherein the amorphous silica is a hydrogel having a SiO$_2$ content from about 25% to about 55% by weight.

10. A method as claimed in claim 1 wherein the amorphous silica is a xerogel or precipitated silica and has a mercury pore volume from about 0.8 to about 2.5 ccg$^{-1}$.

* * * * *